(12) United States Patent
Grosskopf et al.

(10) Patent No.: US 6,863,721 B2
(45) Date of Patent: Mar. 8, 2005

(54) DECORATING SPRAY COMPOSITION AND APPARATUS

(75) Inventors: Jack C. Grosskopf, Ocala, FL (US); Mary C. Thomson, Potomac, IL (US)

(73) Assignee: Signature Brands LLC, Ocala, FL (US)

( * ) Notice: Subject to any disclaimer, the term of this patent is extended or adjusted under 35 U.S.C. 154(b) by 116 days.

(21) Appl. No.: 10/377,469

(22) Filed: Feb. 28, 2003

(65) Prior Publication Data

US 2004/0168607 A1 Sep. 2, 2004

(51) Int. Cl.[7] .............................................. C09D 11/00
(52) U.S. Cl. ................... 106/31.6; 106/31.86
(58) Field of Search .................. 106/31.6, 31.86; 222/1

(56) References Cited

U.S. PATENT DOCUMENTS 4,906,610 A * 3/1990 Boden et al. ................. 512/11
4,950,495 A * 8/1990 Boden et al. ................ 426/536
4,983,579 A * 1/1991 Boden et al. .................. 512/6

* cited by examiner

Primary Examiner—Mark L. Bell
Assistant Examiner—Veronica F. Faison
(74) Attorney, Agent, or Firm—Cohen, Pontani, Lieberman & Pavane

(57) ABSTRACT

A color decorating spray composition comprises a color lake dispersion, an oil, a humectant, an alcohol, a color carrier and drying agent, a color suspending agent, an antifoaming agent, an emulsifier and a propellant. An apparatus for dispensing the composition includes a lined aerosol container filled with the composition, and an aerosol valve assembly including a mounting cup crimped to a formed collar on the container. The valve assembly further includes a valve body fixed in a central aperture of the mounting cup, a valve stem concentrically located in the valve body and loaded against a vapor orifice thereof by a coil spring, and an actuator fitted to the top of the stem. The valve stem has a powder-capable orifice provided with a bead which causes powder to be blown away when the actuator is depressed and composition is expelled through a space between the stem and the valve body.

24 Claims, 1 Drawing Sheet

DECORATING SPRAY COMPOSITION AND APPARATUS

BACKGROUND OF THE INVENTION

1. Field of the Invention

The present invention generally relates to a color spray composition for decorating food products, such as cakes and pastries, and to a process of making such color composition. The invention also relates to a color spray product and the use thereof.

2. Description of the Related Art

Food items, particularly cakes, cookies, pastries and hors d'oeuvres, are often decorated with various patterns or inscriptions for parties or to be presented as gifts. Coatings on these food items are commonly made of icing or gel having food coloring incorporated therein, and typically require manual application using a cake knife or a spatula. The more detailed patterns such as lettering are typically applied using a pastry bag with an appropriately configured applicator.

Decoration of food items using a food color spray, in particular a pre-packaged aerosol spray, would be advantageous in terms of convenience and ease of application. However, several problems have been encountered in developing such a spray. First, the composition of such a spray tends to be unstable, i.e., the color components in the composition tend to settle at the bottom of a container. Second, the composition tends to dry too quickly after being sprayed onto a food item, causing cracks which lend an unappetizing "alligator skin" appearance. Moreover, the valve of the delivery system of a conventional aerosol dispenser can become clogged when used with a food coloring composition, which prevents the color from being effectively delivered to the food items.

Since prior efforts to develop a food decorating spray have not met with success, it would be desirable to provide such a spray, in particular a pre-packaged aerosol spray, which provides ease of application.

SUMMARY OF THE INVENTION

An object of the present invention is to develop a color spray composition for food decoration, which doesn't settle out in the can, which doesn't dry too quickly when applied, and which doesn't clog the spray nozzle during application.

According to the invention, the improved composition includes a color lake dispersion, an oil, a humectant, an alcohol, a color carrying and drying agent, a color suspending agent, an antifoaming agent, an emulsifier and a propellant.

Another object of the present invention is to provide a pre-packaged color decorating spray product including a dispensing apparatus containing the above color spray composition. According to the invention, the dispensing apparatus includes an aerosol container with a food approved coating, a vertical action powder valve, and a vertical action actuator having an orifice not smaller than 0.016 in., designed to give the desired spray pattern.

Yet another object of the present invention is to manufacture a pre-packaged aerosol product. According to the invention, the product is manufactured by the steps of mixing a food grade oil, a humectant, an alcohol, a color carrying and drying agent, a color suspending agent, an antifoaming agent, and an emulsifier to form a stock; adding a color lake dispersion to the stock; filling an aerosol can with the stock; and adding a propellant to the can.

A further object of the present invention is to provide a method of using the color decorating spray dispenser to produce a decorative pattern or inscription on a food item, which comprises the steps of providing an aerosol dispenser containing a food spray composition; providing a stencil having the desired pattern; holding the can at least six inches from the product; interposing the stencil between the container and the food item; and actuating the spray dispenser to deliver the composition toward the stencil.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figures 1, 2:
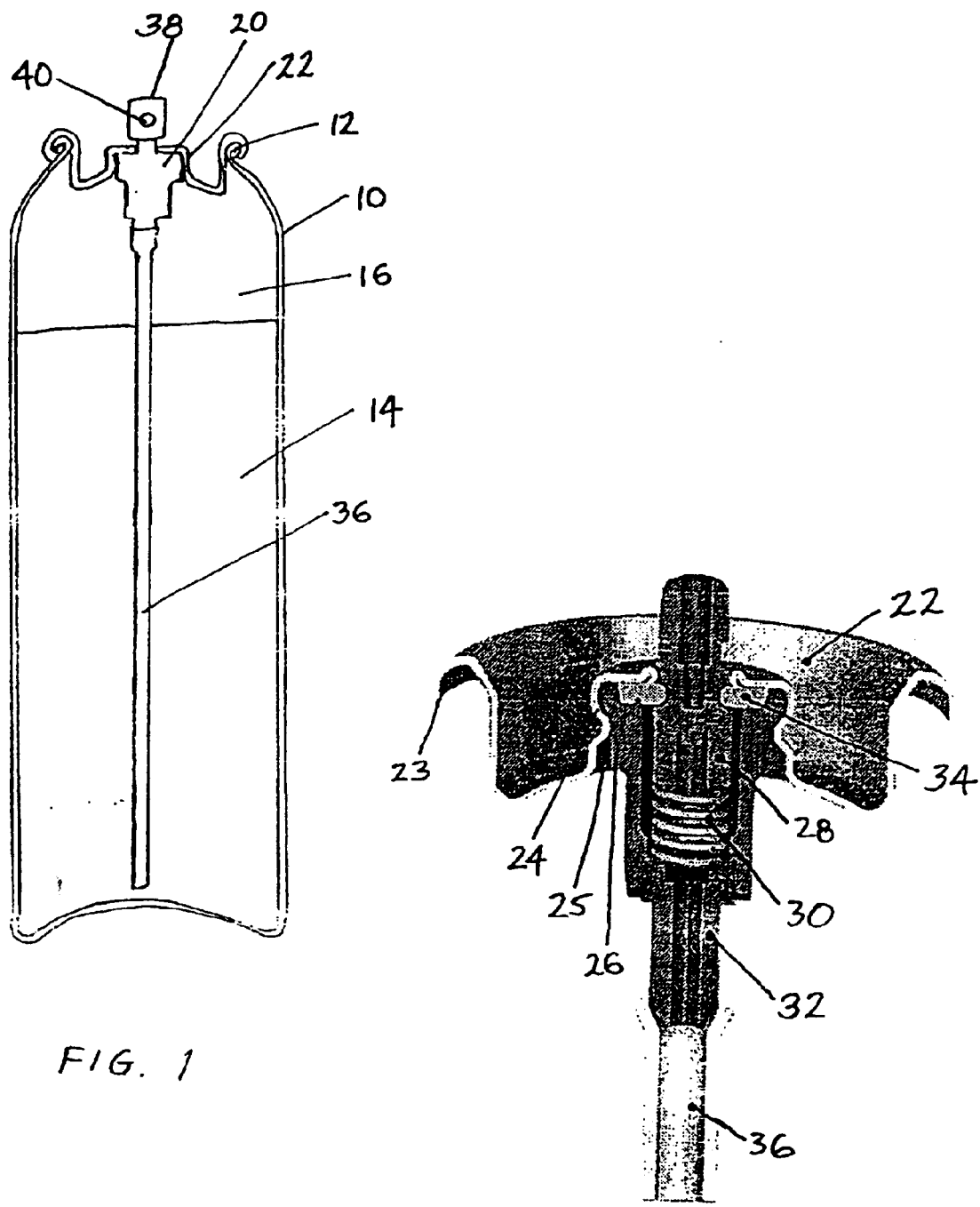
FIG. 1 is a section view of the container showing its contents and the delivery system.
FIG. 2 is a cutaway view of the delivery system.

The improved composition of the color spray for food decoration primarily comprises a color lake dispersion that is a specifically formulated oil based colorant for use in color spray, an oil for keeping the color from drying, a humectant, an alcohol serving as a carrier, a color carrying and drying agent, a suspending agent for keeping solids from settling, an antifoaming agent that minimizes foaming or bubbling of the product when the color spray is applied to a food item, an emulsifier for mixing the oil and alcohol, and a propellant for gas production to pressurize the composition.

The colorants used in the composition are preferably water insoluble lakes that are suspended in an appropriate carrier oil to form a color dispersion blend. As used herein and hereafter, the term "color dispersion blend" or "color dispersion" means liquid colorant preparation. Various color dispersions for different colors are commercially available and can be readily obtained from any color manufacturer, such as Warner-Jenkinson.

Oil can prevent the color applied on food items from drying or cracking. The absence of the oil component in the improved composition may result in a colored pattern having an undesirable "alligator skin" appearance. Any food grade oil, such as corn oil, soybean oil, peanut oil, and mineral oil are suitable for this purpose.

Glycerin is included in the improved composition as a humectant. Any other food grade humectant, e.g. sorbitol, will serve the same purpose to achieve the same result.

Alcohol serves as a carrier. Although any food grade alcohol may be suitable for the present composition, ethanol is the most commonly used alcohol.

A color carrying and drying agent, for example calcium carbonate, is used in the composition so as to make the white color whiter and other colors brighter.

The improved composition also requires a suspending agent to prevent the color from settling or clumping. In the presence of such suspending agents, the color, after a relatively long period of non-use, can be easily re-suspended simply by shaking the container. Silicon dioxide is a preferred suspending agent.

To facilitate the mixing of the oil and the alcohol, an emulsifier is added into the composition. Any food grade emulsifier, for example, a soy lecithin such as Centrophase 152 (trademark of Central Soya Co.), or phosphated mono and diglycerides, such as Lamchem PE 130K (trademark of Lambent Technologies Inc.), may be employed.

Any food grade propellant, for example a propane/isobutane propellant such as Aeron 46 (trademark of Diversified Chemicals and Propellants Corp.), is added to the composition so as to generate sufficient gas or pressure in the container, forcing the mixture of ingredients out of the valve when the actuator is depressed to open the valve.

When all essential ingredients of the present invention are mixed, the resulting mixture becomes an aerosol, which may produce some foam when applied to the food item being decorated. Since foaming or bubbling affects the ability of the color spray to make a homogenous coating, an antifoaming agent is preferably added in the composition. A food grade dimethyl polysiloxane, such as Dow Corning 200 Fluid/350cs, or any silicone derivatives, may be used as such antifoaming agent.

Unless specifically indicated otherwise, all the ingredients used in the present invention should be food grade insofar as the composition is intended for use on food items. Each of the ingredients in the present composition can be readily obtained or generally available to a person of ordinary skill in the art, and are not limited by the sources indicated in the tables below.

According to a preferred embodiment, the color lake dispersion is in an amount of 0.5 to 5% by weight, the oil is in an amount of 5 to 15% by weight, the humectant is in an amount of 0.1 to 2% by weight, the alcohol is in an amount ranging from 10 to 30% by weight, the color carrier and drying agent is in an amount of 2 to 7% by weight, the color suspending agent is in an amount of 0.1 to 2% by weight, the antifoaming agent is in an amount of 0.0001 to 0.001% by weight, the emulsifier is in an amount ranging from 0.1 to 3% by weight, and the balance is propellant in an amount of 5 to 80% by weight.

While the amount of the suspending agent, e.g. silicon dioxide, is limited to less than 2%, the amount of each ingredient may be adjusted or optimized to achieve substantially the same result without departure from the present invention and undue experimentation. If a different amount of an ingredient is employed, so that the percentage of that ingredient is altered, the amount of the propellant should be changed accordingly to balance the amount of the changed ingredient such that the total amount of the composition remains the same.

The present invention is further illustrated by the following exemplary tables, which should not be construed as limiting the scope of the invention.

TABLE I

| Blue Decorating Spray | | |
|---|---|---|
| INGREDIENTS | % BY WEIGHT | SUPPLIERS |
| Blue lake dispersion | 2.0000 | Warner-Jenkinson |
| Corn oil | 11.0000 | ADM |
| Glycerin, 99.7% | 2.0000 | P7G Chemical |
| Ethanol | 19.4990 | Grain Processing |
| Calcium carbonate | 3.0000 | Whittaker |

TABLE I-continued

| Blue Decorating Spray | | |
|---|---|---|
| INGREDIENTS | % BY WEIGHT | SUPPLIERS |
| Silicon dioxide | 2.0000 | Degussa |
| Dimethyl polysiloxane | 0.0010 | Dow Corning |
| Soy lecithin | 0.5000 | Central Soya |
| Propane/isobutane | 60.0000 | Diversified CPC Int'l |
| TOTAL | 100.0000 | |

TABLE II

| White Decorating Spray | | |
|---|---|---|
| INGREDIENTS | % BY WEIGHT | SUPPLIERS |
| White lake dispersion | 2.0000 | Warner-Jenkinson |
| Corn oil | 11.0000 | ADM |
| Glycerin, 99.7% | 2.0000 | P&G Chemical |
| Ethanol | 19.2490 | Grain Processing |
| Calcium carbonate | 3.0000 | Whittaker |
| Silicon dioxide | 2.0000 | Degussa |
| Dimethyl polysiloxane | 0.0010 | Dow Corning |
| Soy lecithin | 0.7500 | Central Soya |
| Propane/isobutane | 60.0000 | Diversified CPC Int'l |
| TOTAL | 100.0000 | |

Red, green, and yellow decorating sprays may be obtained by substituting the respective color lake dispersions for the blue lake dispersion in Table I. Note that only the white decorating spray in Table II has a slightly different composition. The composition can be made by mixing and agitating all ingredients in a mixing vessel. Preferably, the oil, the emulsifier and the humectant are first mixed in the mixing vessel. Then the color dispersion is added and mixed. After that, the alcohol, the suspending agent, the calcium carbonate, and the antifoaming agent are added with agitation. The mixture is dispensed into a can (tube), and either the propellant (e.g. Aeron 46) is added and the valve assembly is crimped onto the can, or the valve assembly is crimped onto the can and the propellant is added through the valve assembly. Finally, the actuator is fitted to the top of the stem to complete the valve assembly.

When the composition is prepared at a manufacturing scale, a practical approach is to first prepare a large stock mixture containing all ingredients except for the color dispersion and the propellant. Then the stock mixture may be divided and distributed into individual batches into which respective colors are added before filling the individual containers.

Referring to FIG. 1, the spray dispensing product according to the invention includes a container 10 having a formed collar 12, a valve assembly 20 including a mounting cup 22 which is crimped onto the collar 12, a spray composition 14 in liquid form, and a gas space 16 above the spray composition. This space 16 contains the propellant in gaseous form which pressurizes the composition 14 to force it into a dip tube 36 which extends to the bottom of the container 10. The remaining propellant is in liquid form, and evaporates as the composition is expelled so that an equilibrium gas pressure is maintained as the space grows larger. The container may be formed of aluminum or tin plate and is provided with a food grade coating to prevent reaction with the composition.

FIG. 2 shows the valve assembly 20 in greater detail. The overall design is conventional, and includes a mounting cup 22 having a skirt 23 and an inner neck 24 with a central aperture 25, a mounting cup gasket 26, a stem 28, a coil spring 30, a valve body 32 which is fixed in the neck 24 against a further gasket 34, and a dip tube 36 fitted to the valve body 32. An actuator 38 having a spray orifice 40 is fitted on top of the valve stem 28 (FIG. 1), the valve stem having an annular shoulder which is spring loaded against the gasket 34 by the spring 30, and an upper end which extends through a central aperture in the gasket. When the actuator 38 is depressed, an upper shoulder on the valve stem 28 moves away from the gasket to release pressurized composition toward the spray orifice 40, causing the composition to be expelled in a spray pattern. The composition moves through the valve body 32 via interstitial spaces between the coils of the spring 30, and via the annular space between the valve stem and the inside wall of the valve body.

According to a preferred embodiment, the mounting cup 22 is formed aluminum coated with lacquer, the gaskets are Buna N rubber, the stem is nylon with an orifice having a diameter in range of 0.013" (one hole) to 2×0.025" (two holes), the spring is stainless steel with a wire diameter of 0.025", the valve body is nylon with a 0.008" to 0.062" tailpiece orifice and a 0.013" to 0.032" vapor top orifice, and the dip tube is polyethylene or polypropylene with a 0.122" inside diameter. The actuator has a spray orifice with a diameter of at least 0.016". A valve assembly having components with these dimensions is the VX series vertical action powder valve available from Seaquist Perfect Dispensing of Cory, Ill. However it must be emphasized that the particular combination disclosed above was chosen pursuant to experimentation with various spray compositions, before the correct dimensions to achieve a working spray apparatus for the disclosed decorating spray composition were determined.

Prior to spraying, the aerosol can containing the composition should be shaken well to ensure that the composition is completely mixed. Then the can is held at approximately 45° and at least 5–6 inches from the food item to be sprayed. The composition is delivered from the can onto the food item through the valve/actuator delivery system by pressing the valve. Where a specific pattern is desired, a stencil may be interposed between the actuator and the food item to be decorated. Such a stencil may be custom made using scissors and folded paper, in the same fashion as children make paper snowflakes.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A color decorating spray composition, comprising a color lake dispersion, an oil, a humectant, an alcohol, a color carrier and drying agent, a color suspending agent, an antifoaming agent, an emulsifier, and a propellant.

2. A composition as in claim 1, wherein said oil is corn oil.

3. A composition as in claim 1, wherein said alcohol is ethanol.

4. A composition as in claim 1, wherein said humectant is glycerin.

5. A composition as in claim 1, wherein said color suspending agent is silicon dioxide.

6. A composition as in claim 1, wherein said antifoaming agent is a dimethyl polysiloxane.

7. A composition as in claim 1, wherein said emulsifier is a soy lecithin.

8. A composition as in claim 1, wherein said propellant is propane/isobutane.

9. A composition as in claim 1 wherein said oil is corn oil, said humectant is glycerin, said alcohol is ethanol, said color carrier and drying agent is calcium carbonate, said color suspending agent is silicon dioxide, said antifoaming agent is dimethyl polysiloxane, said emulsifier is soy lecithin, and said propellant is propane/isobutane.

10. A composition as in claim 1, wherein said color lake dispersion is in an amount of 0.5 to 5% by weight, said oil is in an amount of 5 to 15% by weight, said humectant is in an amount of 0.1 to 2% by weight, said alcohol is in an amount ranging from 10 to 30% by weight, said color carrier and drying agent is in an amount of 2 to 7% by weight, said color suspending agent is in an amount of 0.1 to 2% by weight, said antifoaming agent is in an amount of 0.0001 to 0.001% by weight, said emulsifier is in an amount ranging from 0.1 to 3% by weight, and the balance is said propellant in an amount of 5 to 80% by weight.

11. A method of preparing a color decorating spray composition, comprising the steps of:
   (a) preparing a stock comprising an oil, a humectant, an alcohol, a color carrier and drying agent, a color suspending agent, an antifoaming agent and an emulsifier;
   (b) adding a color lake dispersion to said stock to form a color stock; and
   (c) adding a propellant to said color stock.

12. A method as in claim 10, wherein said oil is corn oil.

13. A method as in claim 10, wherein said alcohol is ethanol.

14. A method as in claim 10, wherein said humectant is glycerin.

15. A method as in claim 10, wherein said color suspending agent is silicon dioxide.

16. A method as in claim 10, wherein said antifoaming agent is dimethyl polysiloxane.

17. A method as in claim 10, wherein said emulsifier is a soy lecithin.

18. A method as in claim 10, wherein said propellant is propane/isobutane.

19. A method as in claim 10 wherein said oil is corn oil, said humectant is glycerin, said alcohol is ethanol, said color carrier and drying agent is calcium carbonate, said color suspending agent is silicon dioxide, said antifoaming agent is dimethyl polyslioxane, said emulsifier is soy lecithin, and said propellant is propane/isobutane.

20. A method as in claim 19, wherein said color lake dispersion is in an amount of 0.5 to 5% by weight, said oil is in an amount of 5 to 15% by weight, said humectant is in an amount of 0.1 to 2% by weight, said alcohol is in an amount ranging from 10 to 30% by weight, said color carrier and drying agent is in an amount of 2 to 7% by weight, said color suspending agent is in an amount of 0.1 to 2% by weight, said antifoaming agent is in an amount of 0.0001 to 0.001% by weight, said emulsifier is in an amount ranging from 0.1 to 3% by weight, and the balance is said propellant in an amount of 5 to 80% by weight.

21. A color decorating spray apparatus comprising:
   an aerosol container;
   a valve assembly fitted to said aerosol container; and
   a color decorating spray composition in said container, said composition comprising a color lake dispersion, an oil, a humectant, an alcohol, a color carrier and drying agent, a color suspending agent, an antifoaming agent, an emulsifier and a propellant.

22. An apparatus as in claim 21 wherein said oil is corn oil, said humectant is glycerin, said alcohol is ethanol, said color carrier and drying agent is calcium carbonate, said color suspending agent is silicon dioxide, said antifoaming agent is dimethyl polyslioxane, said emulsifier is soy lecithin, and said propellant is propane/isobutene.

23. An apparatus as in claim 21, wherein said color lake dispersion is in an amount of 0.5 to 5% by weight, said oil is in an amount of 5 to 15% by weight, said humectant is in an amount of 0.1 to 2% by weight, said alcohol is in an amount ranging from 10 to 30% by weight, said color carrier and drying agent is in an amount of 2 to 7% by weight, said color suspending agent is in an amount of 0.1 to 2% by weight, said antifoaming agent is in an amount of 0.0001 to 0.001% by weight, said emulsifier is in an amount ranging from 0.1 to 3% by weight, and the balance is said propellant in an amount of 5 to 80% by weight.

24. An apparatus as in claim 21 wherein said valve assembly comprises:
   a mounting cup which is fixed to said container, said mounting cup having a neck defining a central aperture;
   a valve body fixed in said central aperture, said valve body having a vapor orifice;
   a gasket seated axially between said valve body and said mounting cup, said gasket having a central aperture;
   a valve stem received concentrically in said vapor orifice, said valve stem having a shoulder facing said gasket and an upper end extending through said central aperture;
   a coil spring seated in said valve body and loading said shoulder against said gasket; and
   an actuator fitted to said upper end of said valve stem, said actuator having a dispensing orifice.

* * * * *